(12) United States Patent
Owen et al.

(10) Patent No.: US 6,799,095 B1
(45) Date of Patent: Sep. 28, 2004

(54) METHOD AND APPARATUS FOR INTERACTIVELY DISPLAYING A ROUTE WINDOW FOR A FLIGHT MANAGEMENT SYSTEM

(75) Inventors: Gary L. Owen, Robins, IA (US); Sarah Barber, Robins, IA (US); George W. Palmer, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 320 days.

(21) Appl. No.: 09/391,782

(22) Filed: Sep. 8, 1999

(51) Int. Cl.[7] .............................. G06F 7/00; G06F 19/00
(52) U.S. Cl. ................. 701/4; 340/995.15; 340/995.19; 345/1.2
(58) Field of Search ......................... 701/4, 3, 13, 117, 701/120, 204, 300; 340/995.15, 995.19; 345/1.2, 349; 342/32, 36, 37

(56) References Cited

U.S. PATENT DOCUMENTS

| | | | | |
|---|---|---|---|---|
| 5,343,395 A | * | 8/1994 | Watts | 364/428 |
| 5,801,942 A | * | 9/1998 | Nixon et al. | 364/188 |
| 6,006,158 A | * | 12/1999 | Pilley et al. | 701/120 |
| 6,038,498 A | * | 3/2000 | Briffe et al. | 701/3 |
| 6,112,140 A | * | 8/2000 | Hayes et al. | 701/14 |
| 6,128,553 A | * | 10/2000 | Gordon et al. | 701/3 |
| 6,151,023 A | * | 11/2000 | Chari | 345/349 |
| 6,154,790 A | * | 11/2000 | Pruett et al. | 710/15 |

OTHER PUBLICATIONS

Co–pending application, Docket No. 99CR106/KE, entitled "Method and Apparatus for Interactively Selecting Display Parameters For An Avionics Flight Display" by Sarah Barber, Norm W. Arons, and George W. Palmer;.

Co–pending application, Docket NO. 99CR107/KE, entitled "Method and Apparatus For Interactively Selecting, Controlling and Displaying Parameters For An Avionics Radio Tuning Unit" by George W. Palmer, Claude Eyssautier, and Gary L. Owen.

Co–pending application, Docket No. 99CR109/KE, entitled "Method and Apparatus For Graphically Inserting Waypoints For a Flight Management System" by Martin Pauly; and.

Co–pending application, DOcket No. 99CR13/KE, entitled "Method And Apparatus For Interactively and Automatically Selecting, Controlling and Displaying Parameters For An Avionics Electronic Flight Display System" by Gary L. Owen.

* cited by examiner

Primary Examiner—Thomas G. Black
Assistant Examiner—Ronnie Mancho
(74) Attorney, Agent, or Firm—Nathan O. Jensen; Kyle Eppele

(57) ABSTRACT

An apparatus and method for displaying FMS information to a pilot with a map segment and a configurable window of textual information which is configurable both in size and content.

4 Claims, 6 Drawing Sheets

| WPT/RT | CRS | DIST | SPD | VPA | ALT | | DIG | ETE | ETA | FUEL | WIND | ISA |
|---|---|---|---|---|---|---|---|---|---|---|---|---|
| ▲ LOTTE | ▲ 088° | 28 | ▲ 0 | | ▲ -9999 | | --- | --:-- | --:-- | ---- | ---T/--- | -T/-- |
| ▲ PACAF | ▲ 088° | 3 | ▲ 0 | | ▲ -9999 | | --- | --:-- | --:-- | ---- | ---T/--- | -T/-- |
| ▲ MIHAL | ▲ 088° | 16 | ▲ 0 | | ▲ 0 | | --- | --:-- | --:-- | ---- | ---T/--- | -T/-- |
| ▲ PLL | ▲ 088° | 9 | ▲ 0 | | ▲ 0 | | --- | --:-- | --:-- | ---- | ---T/--- | -T/-- |
| ▲ JVL | ▲ 109° | 16 | ▲ 300 | | ▲ 19000 | | 50.5 | 0:08 | | 4280 | 010T/55 | |
| ▲ BULLZ | ▲ 109° | 6 | ▲ 300 | | ▲ 18000 | | 34.5 | 0:07 | | 4240 | 010T/50 | |
| ▲ TEDDY | ▲ 109° | 7 | ▲ 250 | | ▲ 10000 | | 28.5 | 0:05 | | 4205 | 020T/30 | |
| ▲ KRENA | ▲ 142° | 12 | ▲ 250 | | ▲ 5000 | | 21.5 | 0:03 | | 4160 | 030T/25 | |
| ▲ PUUNC | ▲ 140° | 5 | ▲ 250 | | ▲ 4000 | | 9.5 | 0:04 | | 4140 | 080T/14 | |
| ▲ LEAMA | ▲ 140° | 5 | ▲ 180 | | ▲ 2500 | | 4.7 | 0:03 | | 4120 | 080T/14 | |
| ▲ RW14L | ▲ 140° | 0 | | | ▲ GRD | | 0 | | | 4100 | 080T/14 | |
| ▲ LAIRD | ▲ 140° | 14 | ▲ 180 | | ▲ 4000 | | | | | 4050 | 030T/25 | |

DEST ▲ KORD   DTG XXXX                                           4100+100
ALTN ▲ ----   DIG XXXX                                           3200+100

*Fig. 6*

METHOD AND APPARATUS FOR INTERACTIVELY DISPLAYING A ROUTE WINDOW FOR A FLIGHT MANAGEMENT SYSTEM

CROSS REFERENCE TO RELATED PATENT APPLICATIONS

This application is related to the below listed co-pending patent applications which are filed on even date herewith, are assigned to the same assignee, and are incorporated herein in their entirety by these references:

An application entitled "Method and Apparatus For Interactively Selecting Display Parameters For An Avionics Flight Display" by Sarah Barber, Norm W. Arons, and George W. Palmer;

An application entitled "Method and Apparatus For Interactively Selecting, Controlling and Displaying Parameters For An Avionics Radio Tuning Unit" by George W. Palmer, Claude Eyssautier, and Matt Smith;

An application entitled "Method and Apparatus For Graphically Inserting Waypoints For A Flight Management System" by Martin Pauly; and An application entitled "Method And Apparatus For Interactively And Automatically Selecting, Controlling And Displaying Parameters For An Avionics Electronic Flight Display System" By Matt Smith and Gary L. Owen.

FIELD OF THE INVENTION

The present invention generally relates to avionics, and more particularly relates to flight management systems (FMSs), and even more particularly relates to combined electronic displaying of textual FMS and graphical map data.

BACKGROUND OF THE INVENTION

In the past, designers of avionics displays and flight computer systems have endeavored to achieve a reduction in pilot workload. One area of concern has been the FMS, which typically requires a significant amount of "heads-down" time. This "heads-down" time occurs when the pilot is neither looking at the primary flight displays, nor out the wind screen, but instead is focused upon a task in an oblique direction, such as when using a typical FMS control display unit (CDU), which is an integrated keyboard and a textual display unit. One approach has been proposed in which a portion of the typical FMS textual information is displayed on a segment of a multi-functional display also containing a map display. A cursor is used to select textual information to be displayed on the map display segment. While these interactive dual format displays have clear advantages, they also have significant drawbacks.

The cockpit can become, at times, a very busy place. During take-off and approach, the workload on a pilot can be extreme. Since the proposed dual format displays are capable of showing only a limited amount of textual information, they still require the pilot to make reference to additional pages or displays. This additional effort, at an already busy time, is quite undesirable.

Consequently, there exists a need for improved methods and apparatuses for displaying both textual FMS data, as well as graphical FMS maps.

SUMMARY OF THE INVENTION

It is an object of the present invention to provide an improved FMS display.

It is a feature of the present invention to utilize a route window which simultaneously displays all textual information relating to a flight plan leg that is displayed on a graphical FMS map display.

It is an advantage of the present invention to reduce heads-down time and thereby enhance situational awareness by providing a single source for all textual information required for a flight plan leg.

It is another feature of the present invention to include a configurable route window size characteristic.

It is another advantage of the present invention to provide for increased control of the amount of textual information displayed at one time.

It is yet another feature of the present invention to include a configurable route window content characteristic.

It is yet another advantage of the present invention to provide for the capability of reducing pilot workloads at critical times, by permitting the route window to be configured in response to current events, such as weather, air traffic, phase of flight (take-off, approach, etc.) to show the most important and timely types of information required by the pilot.

The present invention is an apparatus and method for simultaneously displaying FMS textual data and FMS map data, which is designed to satisfy the aforementioned needs, provide the previously stated objects, include the above-listed features, and achieve the already articulated advantages. The present invention is carried out in a "fixed format-less" manner in a sense that the undesirable constraints of a fixed format textual display segment have been greatly reduced.

Accordingly, the present invention is a multi-mode interactive FMS display which simultaneously displays FMS map data, as well as displays FMS textual data in a configurable route window.

BRIEF DESCRIPTION OF THE DRAWINGS

The invention may be more fully understood by reading the following description of the preferred embodiments of the invention, in conjunction with the appended drawing wherein:

FIG. 6 is a representation of a display of the present invention wherein the entire display is a horizontally and vertically expanded route window of FIG. 2.

DETAILED DESCRIPTION

Figure 1:
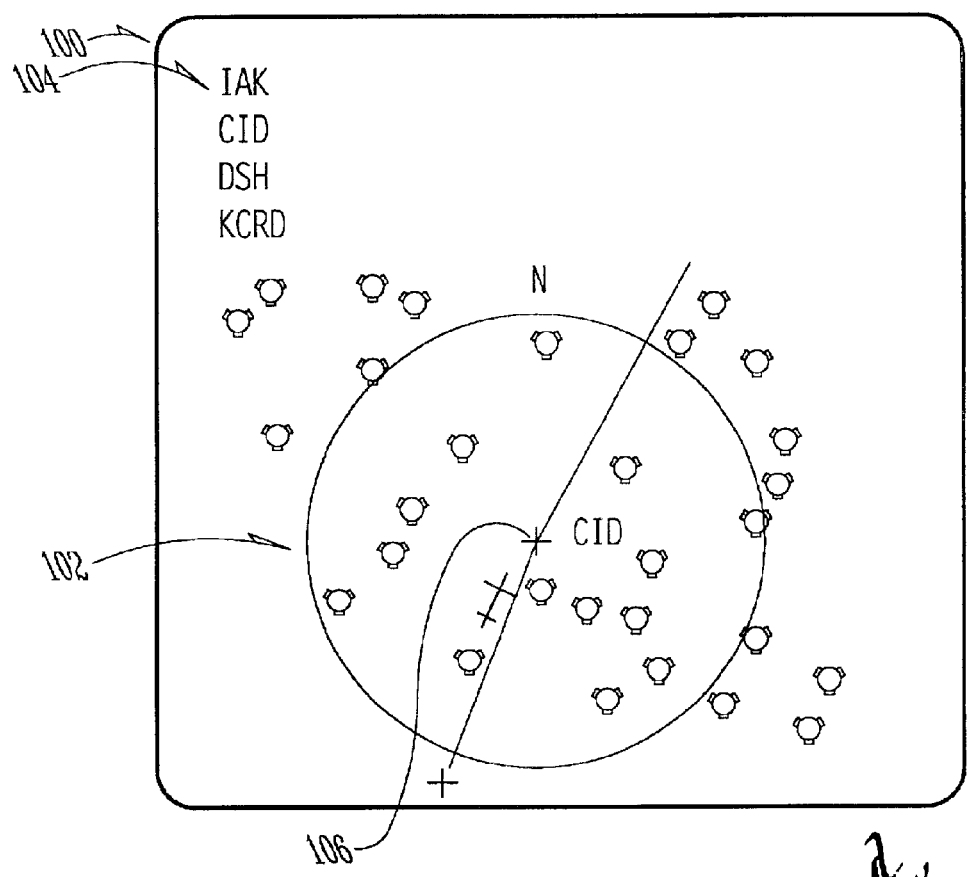
FIG. 1 is a simplified representation of a prior art display, showing both textual and map segments.

Now referring to the drawings wherein like numerals refer to like matter throughout, there is shown in FIG. 1, a display of the prior art, generally designated 100, having a lower section 102, which is a graphical FMS map in a plan position indication format, showing a flight plan leg segment with a centrally disposed leg having an endpoint 106 labeled "CID." Also shown in a top portion of display 100 is FMS textual display segment 104, which shows a limited amount of the information (only waypoints). If the pilot needs additional FMS textual information, then the pilot is required to resort to a prior art CDU.

Figure 2:
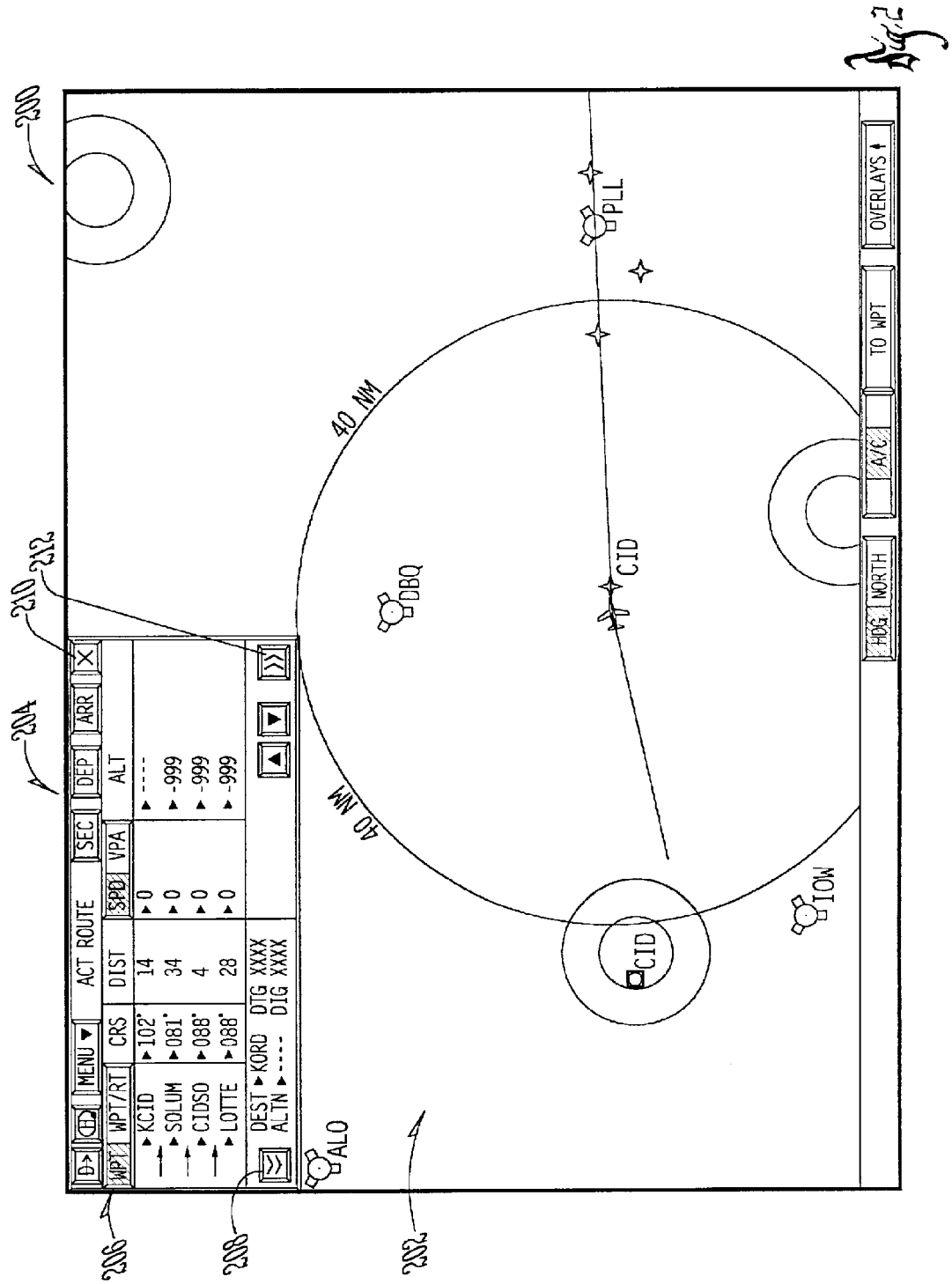
FIG. 2 is a representation of a display of the present invention, wherein the box in the upper left-hand corner is a route window.

Now referring to FIG. 2, there is shown an improved FMS display of the present invention, generally designated 200, showing an adaptive graphical map segment 202 and a configurable route window 204 in the upper left-hand corner. Configurable route window 202 exhibits a graphical user interface (GUI), which is responsive to a cursor device manipulated by the pilot. Adaptive graphical map segment 202 is preferably adaptive in size, position and orientation to the particular configuration of configurable route window 204; however, a static graphical map segment could conceivably be used in an alternate embodiment. For example, adaptive graphical map segment 202 shows graphical map information in all areas other than that which is consumed by configurable route window 204. Additionally, the configurable route window 204 could be displayed without any map of any type, this could be thought of as configuring the configurable route window 204 to a maximum possible size. Configurable route window 204 includes display format parameter control buttons 206, which are variable buttons to give a pilot individual control over the content of the information to be displayed. Display format parameter control buttons 206 currently show WP and WP/RT on one button and SPD and VPA on another button. Note that WPT and SPD are highlighted to show their selection status. Vertical route window expansion/contraction variable direction double chevron button 208 is shown in the lower left-hand corner of configurable route window 204. Vertical route window expansion/contraction variable direction double chevron button 208 is used to expand or contract the vertical size of configurable route window 204. Depending upon the current status (expanded or normal), the directions of the two chevrons thereon are variable. Vertical route window expansion/contraction variable direction double chevron button 208 is shown here with a downward directed chevron, which indicates that the configurable route window 204 is capable of being expanded downward into the free space below it upon clicking vertical route window expansion/contraction variable direction double chevron button 208. A route window removal x button 210 is included which will result in a removal of the configurable route window 204 when clicked upon. Similar to vertical route window expansion/contraction variable direction double chevron button 208, a horizontal route window expansion/contraction variable direction double chevron button 212 is shown. Horizontal route window expansion/contraction variable direction double chevron button 212 is used to expand or contract the horizontal size of the configurable route window 204. Depending upon the current status (expanded or normal), the directions of the two chevrons thereon are variable. Horizontal route window expansion/contraction variable direction double chevron button 212 is shown here with a rightward directed chevron which indicates that the configurable route window 204 is capable of being expanded rightward into the free space to the right of it upon clicking horizontal route window expansion/contraction variable direction double chevron button 212.

Figure 3:
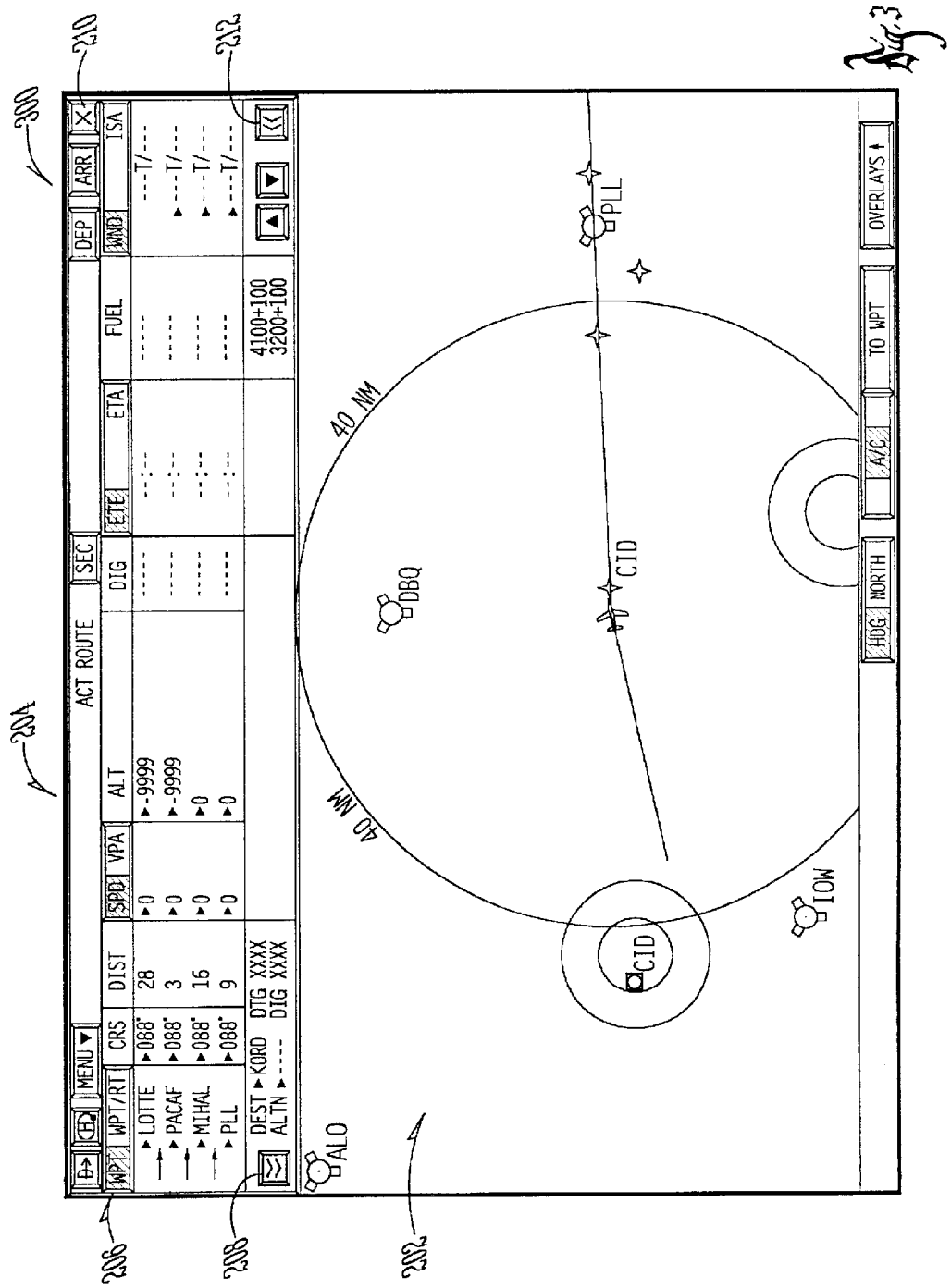
FIG. 3 is a representation of a display of the present invention wherein the box in the upper portion is a horizontally expanded route window of FIG. 2.

Now referring to FIG. 3, there is shown a display of FIG. 2, generally designated 300, where the horizontal route window expansion/contraction variable direction double chevron button 212 has been clicked to expand the configurable route window 204. Adaptive graphical map segment 202 has adapted to the configuration of configurable route window 204. Horizontal route window expansion/contraction variable direction double chevron button 212 now shows its variable double chevrons pointed in a leftward direction to indicate the capability of contracting the configurable route window 204 in a leftward direction upon clicking of horizontal route window expansion/contraction variable direction double chevron button 212. Vertical route window expansion/contraction variable direction double chevron button 208 is unchanged with respect to FIG. 2. Now with the expanded horizontal size of configurable route window 204 display format parameter control buttons 206 have grown in number to include additional parameters of ETE and ETA on one new button and WND and ISA on another new button. Note that ETE and WND are highlighted to show their selection status. Clearly, the clicking of horizontal route window expansion/contraction variable direction double chevron button 212 had resulted in a reconfiguration of configurable route window 204 to a larger horizontal size thereby allowing for more textual FMS data to be displayed.

Figure 4:
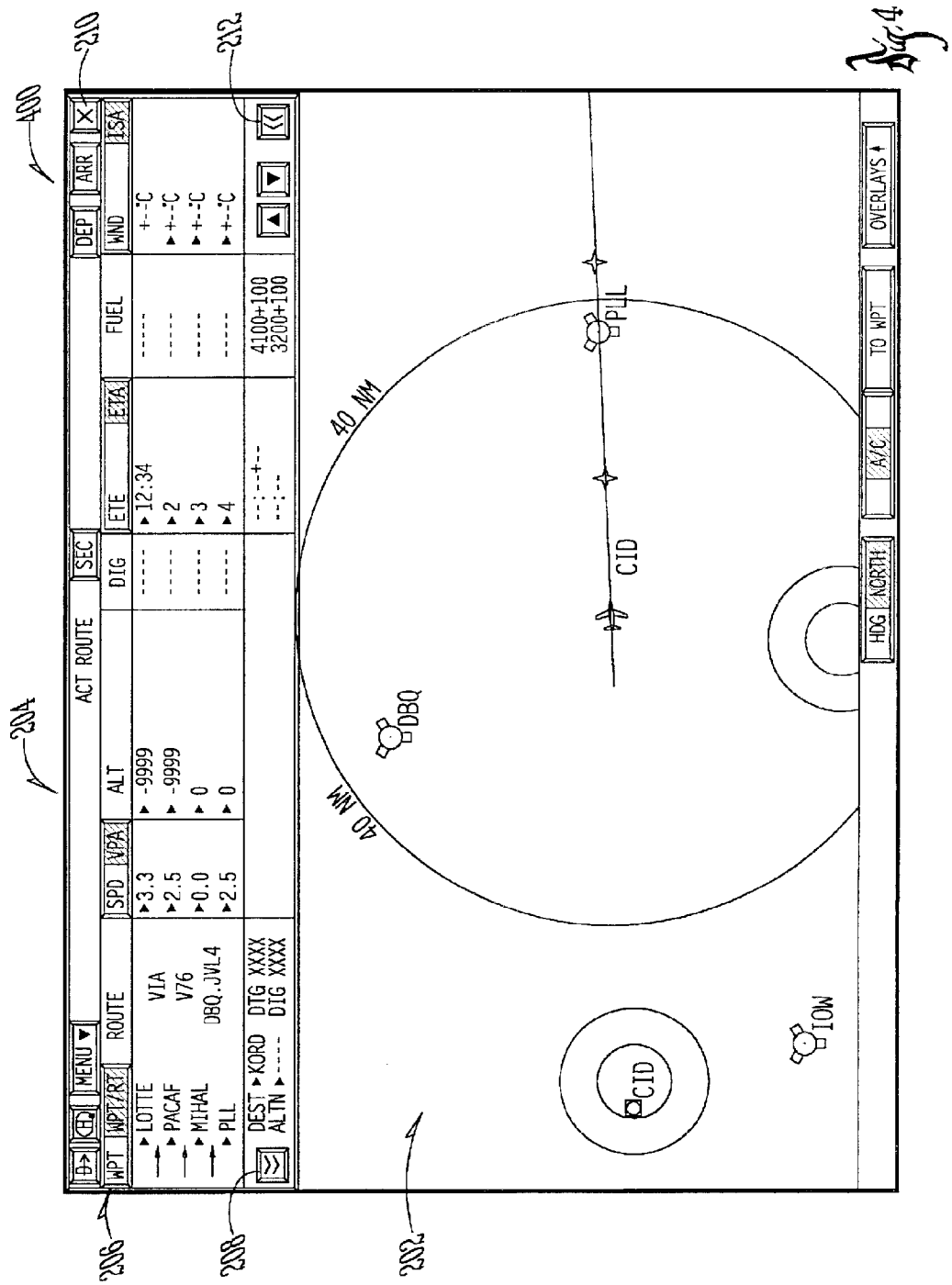
FIG. 4 is a representation of a display of the present invention wherein the box in the upper portion includes alternate parameters with respect to those shown in the route window of FIG. 3.

Now referring to FIG. 4, there is shown a display of FIG. 3 where the configurable route window 204 remains the same in size, but the content of the parameters selected has changed. Display format parameter control buttons 206 have had each of their parameters changed. Note that WPT/RT, VPA, ETA and ISA are now all highlighted to show their new selection status. The information displayed below these buttons with changed highlighting has correspondingly changed in response to the new selection status of each button. The size, orientation and direction of adaptive graphical map segment 202, vertical route window expansion/contraction variable direction double chevron button 208 and horizontal route window expansion/contraction variable direction double chevron button 212 are unchanged with respect to FIG. 3 because neither vertical route window expansion/contraction variable direction double chevron button 208, nor horizontal route window expansion/contraction variable direction double chevron button 212, were clicked and, therefore, adaptive graphical map segment 202 has no size and orientation changes from which it needs to respond.

Figure 5:
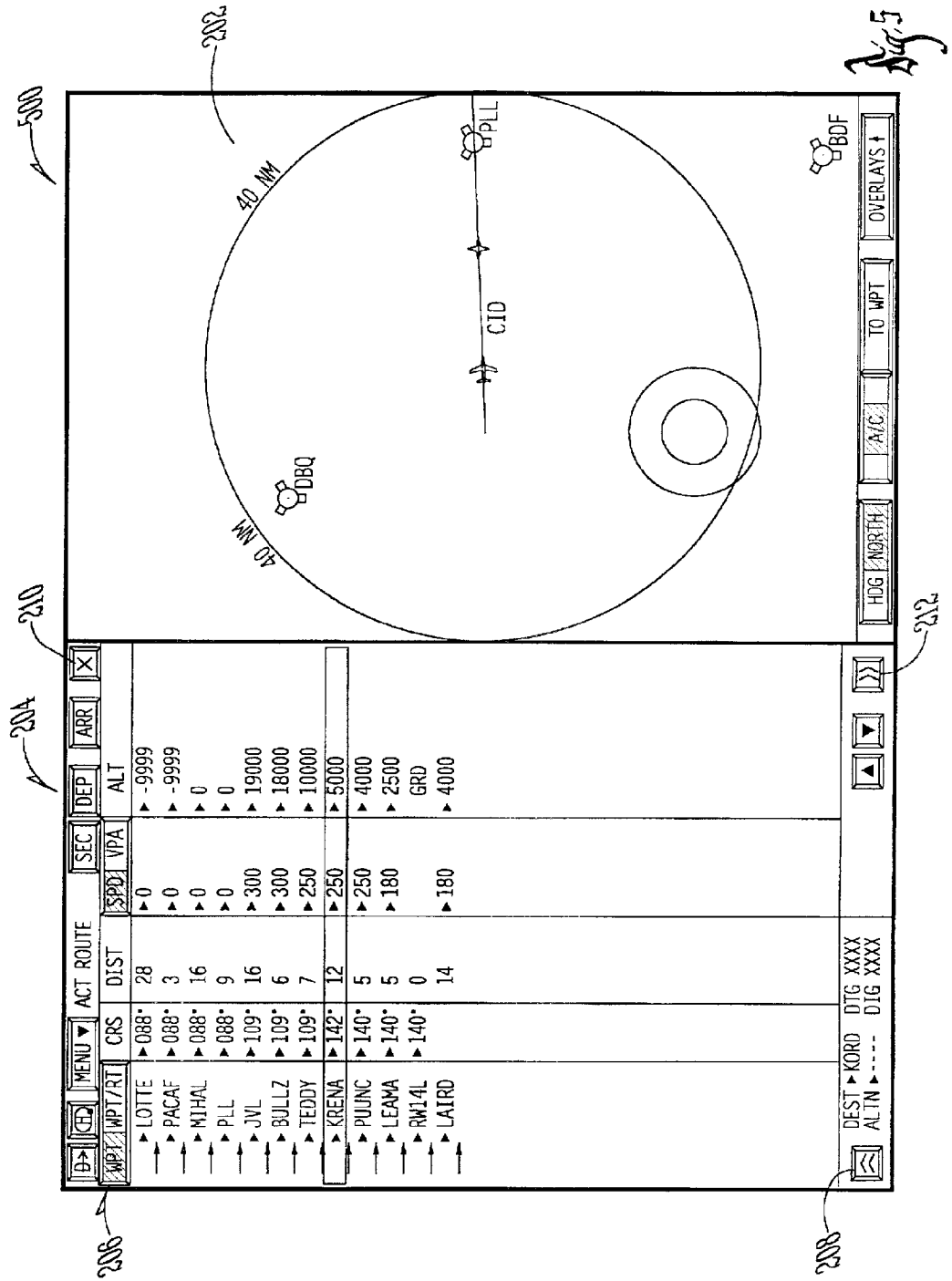
FIG. 5 is a representation of a display of the present invention wherein the box in the left portion is a vertically expanded route window of FIG. 2.

Now referring to FIG. 5, there is shown a display, generally designated 500, where the configurable route window 204 has been vertically expanded, in relation to FIG. 2, in response to a clicking of vertical route window expansion/contraction variable direction double chevron button 208. Note that the direction of the double chevrons of vertical route window expansion/contraction variable direction double chevron button 208 is now pointing upward to designate that the configurable route window 204 can be contracted in an upward direction upon an additional click of vertical route window expansion/contraction variable direction double chevron button 208. Adaptive graphical map segment 202 has adapted its size and orientation to the newly reconfigured configurable route window 204. Display format parameter control buttons 206 remain unchanged in number and selection; however, the amount of lines of information displayed beneath each of the display format parameter control buttons 206 has increased.

Now referring to FIG. 6, there is shown a display generally designated 600, which could be the result of either clicking the vertical route window expansion/contraction variable direction double chevron button 208 of FIG. 3, or clicking the horizontal route window expansion/contraction variable direction double chevron button 212 of FIG. 5. In either case, the configurable route window 204 has expanded to consume the entire viewing area of the display 600. Adaptive graphical map segment 202 (now not shown in FIG. 6) has been adapted to be completely removed from view. Note that the directions of the double chevrons of vertical route window expansion/contraction variable direction double chevron button 208 and horizontal route window expansion/contraction variable direction double chevron button 212 both designate that the configurable route window 204 can only be contracted.

Throughout this description, the terms "buttons" and "clicking" have been used. They are selected because they are believed to readily convey the present invention; however, it should be understood that other visual marks, other than buttons, could be substituted, and actions other than clicking could be substituted as well. It is intended that the present invention and the claims below be read to include all variations of these concepts. The parameters shown in display format parameter control buttons 206 are merely exemplary of many other parameters and abbreviations for such parameters which could be used with the present invention. Configurable route window 204 is shown with its home position in the upper left-hand corner of the display. This is a matter of designer choice, which can be readily varied, depending upon the particular design criteria for a particular display.

The hardware and software to create the displays of the present invention are either well known in the art, or could be adapted, without undue experimentation, from well-known hardware and software, by persons having ordinary skill in the art, once they have carefully reviewed the description of the present invention included herein.

It is thought that the method and apparatus of the present invention will be understood from the foregoing description and that it will be apparent that various changes may be made on the form, construct steps and arrangement of the parts and steps thereof, without departing from the spirit and scope of the invention or sacrificing all of their material advantages. The form herein described is merely a preferred exemplary embodiment thereof.

What is claimed is:

1. An avionics FMS comprising:
   a source of FMS route data;
   a display coupled to said source of FMS route date for visually presenting said FMS route data;
   a configurable route window, presented on said display;
   said configurable route window has a configurable window size;
   said display presents an adaptive graphical map segment;
   wherein said adaptive graphical map segment adapts to a sized characteristic of said configurable route window;
   wherein said configurable route window includes a vertical route window expansion/contraction button; and
   wherein said vertical route window expansion/contraction button is a vertical route window expansion/contraction variable direction indicating button.

2. An avionics FMS of claim 1 wherein said vertical route window expansion/contraction variable direction indicating button is a vertical route window expansion/contraction variable direction double chevron button.

3. An apparatus of claim 2 wherein said configurable route window includes a plurality of display format parameter control buttons; and
   wherein each of said plurality of display format parameter control buttons includes a plurality of selectable regions thereon which are independently capable of being highlighted to indicate a selection status.

4. An avionics FMS comprising:
   a source of FMS route data;
   a display coupled to said source of FMS route data for visually presenting said FMS route date;
   a configurable route window, presented on said display;
   said configurable route window has a configurable window sizes;
   said display presents an adaptive graphical map segment;
   wherein said adaptive graphical map segment adapts to a sized characteristic of said configurable route window;
   wherein said configurable route window includes a vertical route window expansion/contraction button; and
   wherein said configurable route window includes a horizontal route window expansion/contraction button.

* * * * *